ional patent

United States Patent [19]
Laskey

[11] 3,896,463
[45] July 22, 1975

[54] ACCESSORY MOUNTING APPARATUS FOR CAMERA

[76] Inventor: Donald M. Laskey, 2143 Wealthy S.E., Grand Rapids, Mich. 49506

[22] Filed: Jan. 2, 1974

[21] Appl. No.: 429,511

[52] U.S. Cl. ............................................. 354/122
[51] Int. Cl. ......................................... G03b 17/12
[58] Field of Search ............ 350/257; 354/296, 122

[56] References Cited
UNITED STATES PATENTS
2,953,970   9/1960   Maynard............................ 350/257
3,122,077   2/1964   Splendore.......................... 354/296

Primary Examiner—John M. Horan
Attorney, Agent, or Firm—McGarry & Waters

[57] ABSTRACT

A simplified accessory mounting apparatus for mounting accessories on the barrel of a camera comprises an annular ring formed of magnetically permeable material mounted on the end of the camera barrel and a mechanical retainer or pocket mounted on one side of the outer surface of the ring. A small magnet is affixed to each accessory at a point adjacent the outer edge thereof, such that one side of the accessory fits in the pocket and the other side of the accessory is magnetically attached to the annular ring by interaction between the magnet and the annular ring. The accessory mounting apparatus also may be used for masking a camera lens by using flexible magnetic sheet material as the masking material.

6 Claims, 5 Drawing Figures

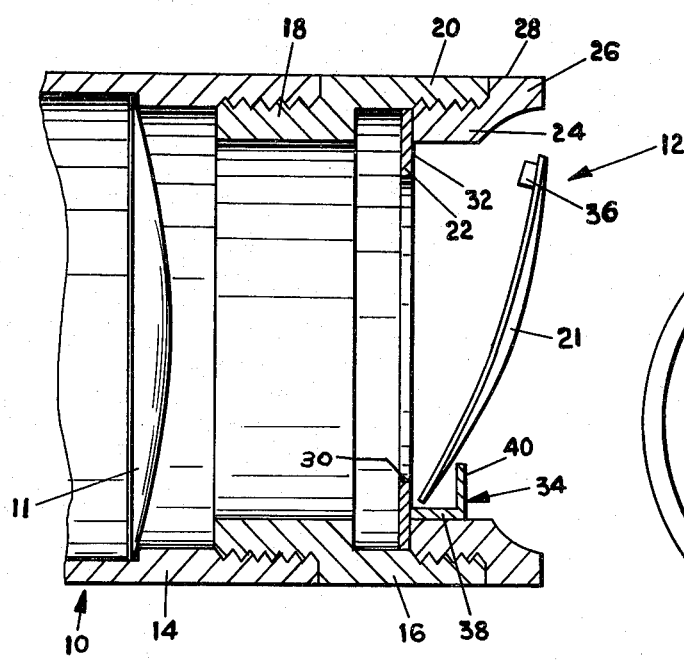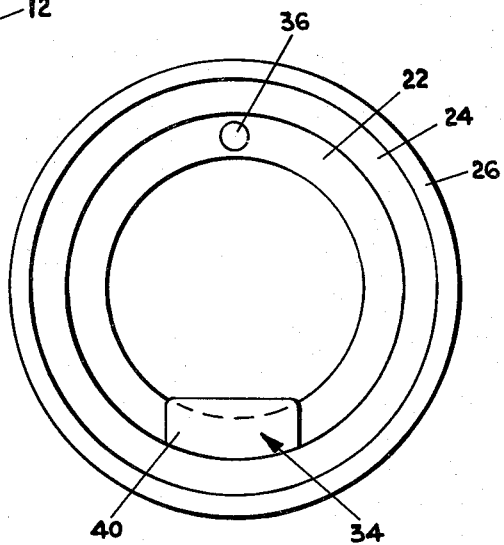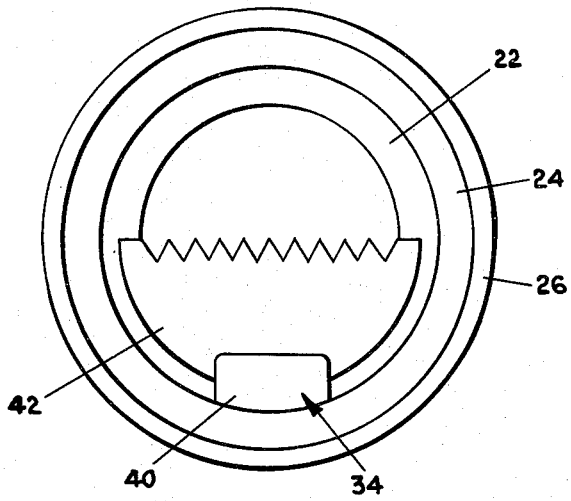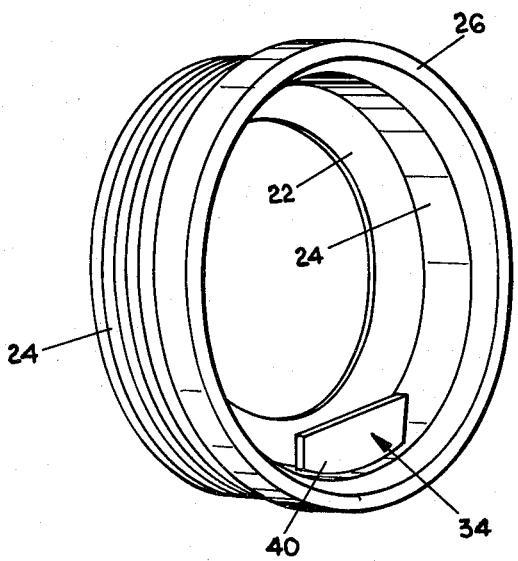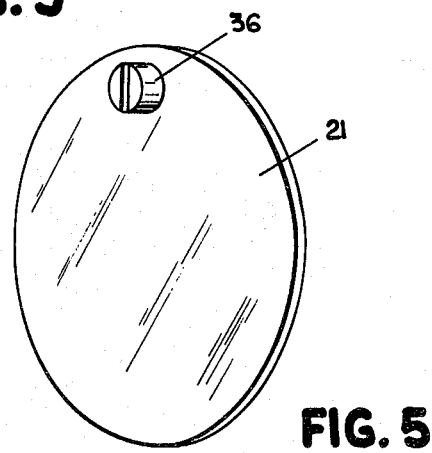
FIG.1
FIG.2
FIG.3
FIG.4
FIG.5

3,896,463

ACCESSORY MOUNTING APPARATUS FOR CAMERA

BACKGROUND OF THE INVENTION

1. Field of the Invention

This invention relates to apparatus for mounting accessories on the barrel of a camera and more particularly to mounting apparatus wherein a lens or other accessory is removably mounted on the end of the camera barrel by a combination of a mechanical retainer and a magnet.

2. Description of the Prior Art

There are a number of camera accessories that are designed to be mounted over the regular lens of a camera for special effects or special treatment of the subject matter. Such accessories include various lenses and filters, as well as masks for partially obscuring or vignetting the subject matter to be photographed. Because such accessories are used only for special effects or under special circumstances, it is desirable to make it as easy as possible to mount and remove such accessories from the barrel of the camera.

One type of apparatus for mounting accessories such as lenses and filters or the like to the barrel of a camera comprises a magnetically permeable adapter ring that is screwed on the end of the barrel and a magnetic retaining ring that fits over the adapter ring and is held thereto by an annular magnet that runs around the outer perimeter of the retaining ring. Optical devices such as lenses or the like fit into annular recesses in the back of the retaining rings and are held in place between the retaining rings and the adapter ring by magnetic action between the retaining rings and the adapter ring.

One of the problems with this type of apparatus is that different sizes of retaining rings may be required for different sizes of lens or filters that are employed in connection with the camera, since the filters and lenses must fit reasonably closely within the opening in the back side of the retaining ring. Another problem with this type of apparatus is that unnecessary expense is involved in employing a separate retaining ring for holding the lens or filter in place, particularly a retaining ring that utilizes a magnet that encloses the entire periphery of the retaining ring.

SUMMARY OF THE INVENTION

The present invention is a simplified apparatus for removably mounting accessories on the barrel of a camera and comprises a magnetically permeable mounting ring mounted on the end of a camera barrel, with a mechanical retaining means extending from one side of the mounting ring for engaging and holding one side of a camera accessory on the ring. A magnet is mounted on the other side of the accessory near the outer periphery thereof, such that the one side of the accessory is held on the camera barrel by means of the mechanical retaining means and the other side of the accessory is held in place magnetically by the interaction of the magnet and the annular ring.

The apparatus of the present invention obviates the need for circular magnets and eliminates the need for a separate retaining ring in order to hold lenses or filters or the like on the end of the camera barrel. With the present invention, only a small pole magnet need be employed, and this can be fastened directly to the accessory itself. Thus, considerable savings is effected in utilizing the apparatus of the present invention.

Another advantage of the apparatus of the present invention is the simplicity with which auxiliary lenses, filters and other similar accessories comprising solid, non-magnetic disc members are mounted on the camera. In order to mount such accessories on the camera, it is only necessary to fit one edge of an accessory in the retainer and to lay the other side of the accessory back against the annular ring. Removal of the accessory is a similarly easy task.

Another important feature of the accessory mounting apparatus of the present invention is that vignetting or a partial masking of the camera lens may be effected by mounting a flexible magnetic masking material on the annular ring of the mounting apparatus. This masking material may be annular in shape so that it masks the other periphery of the picture or it may be any other desired shape for masking a portion of the picture being taken. To remove or install masking material of this nature on the camera it is only necessary to fit the material in its desired position on the annular ring, with the magnetic properties of the magnetic masking materials serving as the means for holding the magnetic material in place on the annular ring.

These and other advantages and features of the present invention will hereinafter appear, and, for purposes of illustration but not of limitation, a preferred embodiment of the present invention is described in detail below.

BRIEF DESCRIPTION OF THE DRAWINGS

FIG. 1 is a side sectional view of a camera employing the accessory mounting apparatus of the present invention.

FIG. 2 is a front view of a camera employing the accessory mounting apparatus of the present invention.

FIG. 3 is a front view showing the use of the present invention for mounting masking or vignetting materials.

FIG. 4 is a perspective view of the mounting ring of the accessory mounting apparatus of the present invention.

FIG. 5 is the perspective view of a lens or filter on which a magnet has been mounted for use in connection with the present invention.

DETAILED DESCRIPTION OF THE PREFERRED EMBODIMENT

Referring now to the drawings, a camera 10 having a lens 11 is depicted in FIG. 1 employing an accessory mounting apparatus 12 embodying the features of the present invention. The present invention could be employed with some other type of optical device, such as a telescope or the like, but for exemplary purposes it will be described in the manner in which it would be employed in connection with a camera. The outer end of camera barrel 14 is threaded internally, and a standard camera adapter 16 is fitted on the outer end of the barrel by means of an externally threaded inner end 18 that screws into the end of barrel 14. Standard camera adapter 16 has an internally threaded outer end 20, which is adapted to receive accessory mounting apparatus 12.

In accordance with the present invention, accessory mounting apparatus 12 comprises a flat, annular mounting ring 22 formed of magnetically permeable material such as iron and the like. The mounting ring comprises an externally threaded mounting collar 24 that extends around the outer periphery of annular ring 22, and fits in threaded end 20 of the camera adapter. A flared outer end 26 of the collar fits over the end of the camera adapter and provides an outer edge 28 for removing and installing the accessory mounting apparatus from the camera. Outer edge 28 may be textured to provide a convenient gripping surface.

Magnetically permeable ring 22 extends radially inwardly from collar 24 to an inner edge 30 that extends inwardly beyond the end of collar 24, thus providing an annular flat surface 32 for purposes of mounting accessories to the camera.

A mechanical retainer or pocket 34 is mounted on the outside surface of the annular ring, preferably at the bottom of the camera barrel, as shown in FIG. 1. Retainer 34 comprises a ledge 38 extending outwardly from ring 22 and an upwardly extending edge 40 attached to the outer end of ledge 38. Retainer 34 thus forms a pocket or recess into which an edge of the lens or other accessory may fit. It should be recognized that other forms of clips or retaining means could be employed in order to mechanically hold one side of the lens to the outer surface of the annular ring 22. The retaining means 34 is preferably mounted at the bottom of annular ring 22, so that an auxiliary lens or other such accessory will rest in the pocket, even when it is not magnetically attached to the ring.

An accessory 21 in the form of a lens or similar accessory is attached magnetically to the annular ring 22 by means of a small magnet 36. A lens is shown in the illustrative embodiment, but any filter or other type of accessory that is a solid, non-magnetic disc member may be fitted on the accessory mounting apparatus in this manner. Magnet 36 is a small pole magnet that may be of any form or shape that is cemented or otherwise attached directly to the accessory near the outer periphery thereof. In the embodiment shown herein, a small cylindrical magnet about one-fourth inch in diameter effects satisfactory holding attraction between the accessory and the annular ring. The magnet is attached to the lens at a point such that when the lens rests in the pocket (as shown in FIG. 1) and the retaining means in the lens is pivoted in a rearward direction, the magnet comes into direct contact with the annular ring and holds the lens in place by magnetic interaction between the magnet and the annular ring.

In a similar manner, removal of the lens is a simple matter of prying the lens away from the ring with a fingernail or prying device.

Another use for the accessory mounting apparatus of the present invention is shown in FIG. 3, wherein a mask 42 formed of magnetic material is substituted for a lens or a filter. Since the mask is opaque, it is possible to make the entire mask out of a magnetic material as opposed to fastening a magnet onto the material. Thus, the magnetic material may be cut or shaped to any desired configuration and magnetically attached to the annular ring at any position desired. In the exemplary embodiment shown herein, the mask blocks the bottom half of the picture and provides a serrated border. By using magnetic masking materials in the accessory mounting apparatus of the present invention, vignetting (i.e., producing a faded border) and similar masking effects are easy to achieve. Flexible magnetic sheet materials suitable for use as masking material in the context of the present invention are readily available commercially.

It should be understood that the foregoing is merely a preferred embodiment of the present invention and that various changes and modifications may be made in the arrangements and details of construction of the embodiment disclosed herein without departing from the spirit and scope of the present invention.

The embodiments of the invention in which an exclusive property of privilege is claimed are defined as follows:

1. Apparatus for mounting accessories in the form of solid, non-magnetic disc members on the barrel of a camera comprising:

an annular ring formed of magnetically permeable material mounted on the end of the camera barrel;

mechanical retaining means positioned adjacent the outer surface of the annular ring and adapted to engage and hold one side of an accessory next to the ring, the mechanical retaining means comprising pocket means formed adjacent the outer surface of the annular ring and adapted to receive an outer edge of the accessory;

magnetic mounting means affixed directly to each accessory at a point adjacent the outer periphery thereof, such that one side of the accessory is held in place by said retaining means and the other side of the accessory is magnetically attached to the ring by interaction between the magnetic mounting means and the ring, the magnetic mounting means comprising a magnet mounted at a point on the outer periphery of the accessory such that one edge of the accessory fits in the pocket means and the other side of the magnet is held against the annular ring by interaction of the magnet and the annular ring.

2. Apparatus as claimed in claim 1 wherein the pocket means comprises a ledge that extends outwardly from the bottom of the annular ring and an upwardly extending edge attached to the outer end of the ledge.

3. Apparatus as claimed in claim 1 wherein the magnet is a small pole magnet cemented to a point on the outer periphery of the accessory.

4. Apparatus as claimed in claim 1 wherein:
the accessory is masking means for obscuring a predetermined portion of the pictures, said masking means comprising a flexible, magnetic sheet material that is mounted on the camera by magnetic interaction between the sheet material and the annular ring.

5. Apparatus as claimed in claim 1 wherein:
the annular ring comprises an externally threaded annular collar;
the externally threaded annular collar is threadingly received in an internally threaded outer end of a standard lens adapter; and
the outer end of the camera barrel is internally threaded, and the standard lens adapter comprises an externally threaded collar that is threadingly received in the outer end of the camera barrel.

6. Apparatus for mounting accessories in the form of solid non-magnetic disc members on the barrel member of a camera comprising:

an annular ring formed of magnetically permeable material mounted on one of said members and extending about the outer periphery thereof such that the annular ring is interposed between the end of the camera barrel and the accessory when the accessory is mounted on the end of the camera barrel;

a small pole magnet mounted on the other of said members at a point such that the magnet engages the annular ring when the accessory is mounted on the end of the camera barrel, said magnet being sufficiently strong to hold the accessory on the end of the camera barrel; and mechanical retaining means in the form of a pocket means mounted on the end of the camera barrel positioned such that said retaining means engages the outer periphery of the accessory and holds the accessory in alignment on the end of the camera barrel.

* * * * *